United States Patent [19]

Muszumanski

[11] 3,927,931

[45] Dec. 23, 1975

[54] VARIFOCAL OBJECTIVE

[75] Inventor: Trude Muszumanski, Vienna, Austria

[73] Assignees: Karl Vockenhuber; Raimund Hauser, both of Vienna, Austria

[22] Filed: Dec. 28, 1973

[21] Appl. No.: 429,696

[30] Foreign Application Priority Data
Jan. 3, 1973   Austria .................................. 45/73

[52] U.S. Cl. ................................. 350/184; 350/186
[51] Int. Cl.² ......................................... G02B 15/00
[58] Field of Search ............................ 350/184, 186

[56] References Cited
UNITED STATES PATENTS

| | | | |
|---|---|---|---|
| 3,346,320 | 10/1967 | Macher................................ | 350/184 |
| 3,350,155 | 10/1967 | Macher................................ | 350/184 |
| 3,556,641 | 1/1971 | Takahashi............................ | 350/184 |
| 3,715,151 | 2/1973 | Muszumanski et al. ............. | 350/184 |

*Primary Examiner*—Edward S. Bauer
*Assistant Examiner*—Conrad J. Clark
*Attorney, Agent, or Firm*—Ernest G. Montague; Karl F. Ross; Herbert Dubno

[57] ABSTRACT

A varifocal objective with a zoom range of about 1:1.8 or 1:1.9 consists of a fixed positive front component, a fixed positive rear component and a single axially shiftable negative intermediate component. The front component consists of a biconcave first lens and closely spaced positive second and third lenses, these latter lenses being separated from the first lens by a large air space nearly equal to half the overall axial length of that component. The intermediate second component is a single biconcave lens. The rear component consists of five air-spaced lens members of which the first, second, third and fifth members are positively refracting singlets, the negatively refracting fourth member being either a doublet or singlet.

5 Claims, 4 Drawing Figures

VARIFOCAL OBJECTIVE

FIELD OF THE INVENTION

My present invention relates to a varifocal objective suitable for use as a zooming projection objective, and comprising a first positive front component on the side of the long conjugate intercept length or front-focal length, a positive base lens assembly or rear component on the side of the short conjugated, and a negative intermediate component which is axially slidable between the front component and the base lens assembly.

PRIOR ART

Conventional varifocal objectives of the type referred to above, with but a single axially shiftable component, suffer from the disadvantage that the brightness on the outermost image edge is reduced to 30 percent with respect to the brightness in the center of the image. Moreover, the structural length of the lens elements which constitutes the varifocal system amounts to more than 1.7 times the maximum focal length of the zoom objective. The structural length mentioned above refers to the constant distance between the front and rear components if all the components are assumed to consist of infinitely thin lenses.

OBJECT OF THE INVENTION

The object of the invention is the provision of an improved varifocal or zoom objective capable of being relatively cheaply manufactured and providing an improved overall performance as compared with prior-art zoom objectives of the type described.

SUMMARY OF THE INVENTION

In accordance with my present invention, the axially fixed front component of a varifocal objective of the general type described above consists of a negative first lens, a positive second lens, and a positive third lens closely spaced from the second lens, the first lens being separated from the second lens by an air space which is substantially greater than the spacing of the second and third lenses and which preferably equals close to half the axial length of this front component. The shiftable intermediate component is a single negative lens whereas the rear component consists of a plurality of positive lens members and an interposed negative lens member.

Advantageously, the negative lenses of the front and intermediate components are biconcave, the second lens of the front component being biconvex while the third lens thereof is nearly planoconvex with an almost flat rear surface. The lens members of the rear component may be, from front to rear, two biconvex positive singlets, a meniscus-shaped positive singlet, a biconcave lens member which may be either a doublet or a singlet, and another biconvex singlet. I have found that the relatively large distance between the first and second lenses of the first component, which may substantially exceed the diagonal of the image format $2y'$, provides a particularly advantageous correction combined with a short structural length. There is also the advantage that the brightness at the outer image edge amounts to more than 40 percent of the brightness in the image center, in a system having a relative aperture of 1:1.2, while maintaining a correction which is characterized by high contrast over the entire image field and the entire zoom range. Another advantage of my improved varifocal objective is that it consists of a relatively small number of lenses which can be produced from relatively inexpensive kinds of glass.

BRIEF DESCRIPTION OF THE DRAWING

The invention will now be described in more detail, by way of example, with reference to the accompanying drawing in which.

Figure 1:
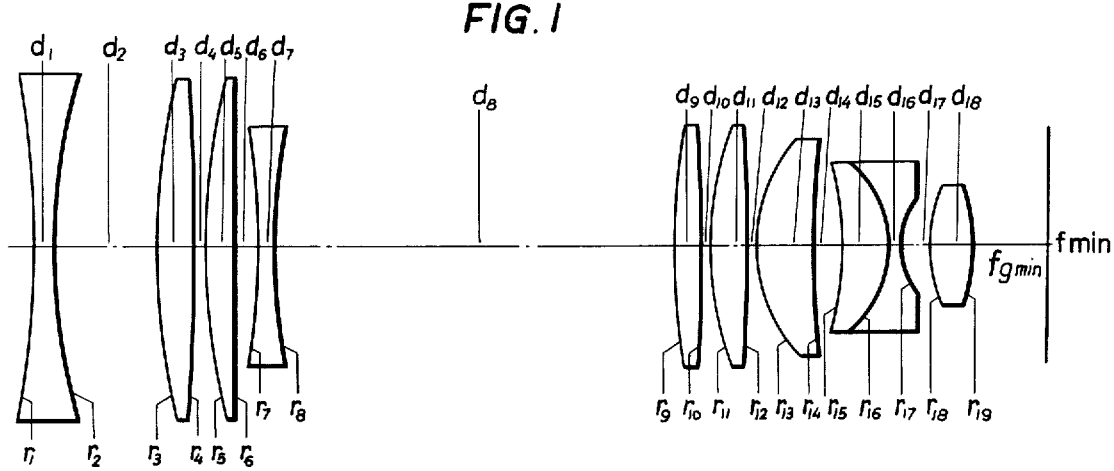
FIG. 1 shows diagrammatically an axial section through a varifocal objective according to my invention, intended for a film projector (not shown) in a position of minimum overall focal length.
Figure 2:
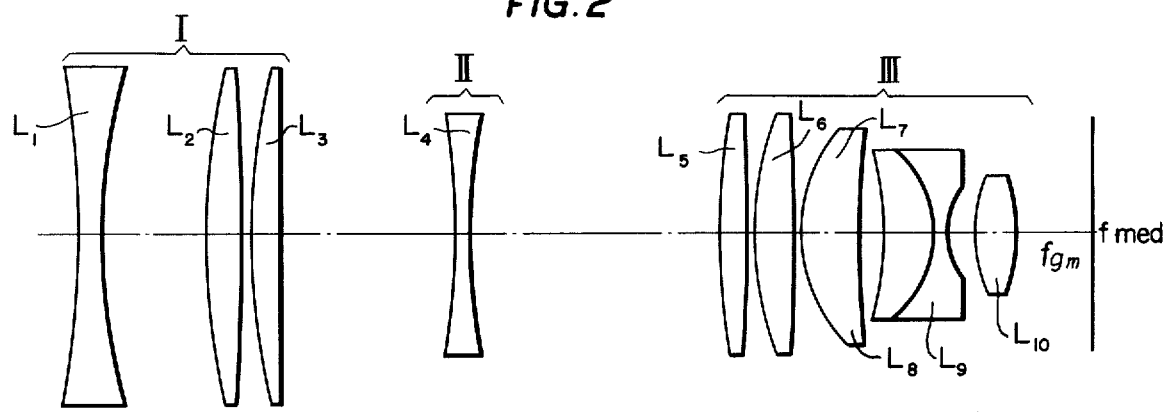
FIG. 2 illustrates the components of the objective in their setting for an intermediate overall focal length.
Figure 3:
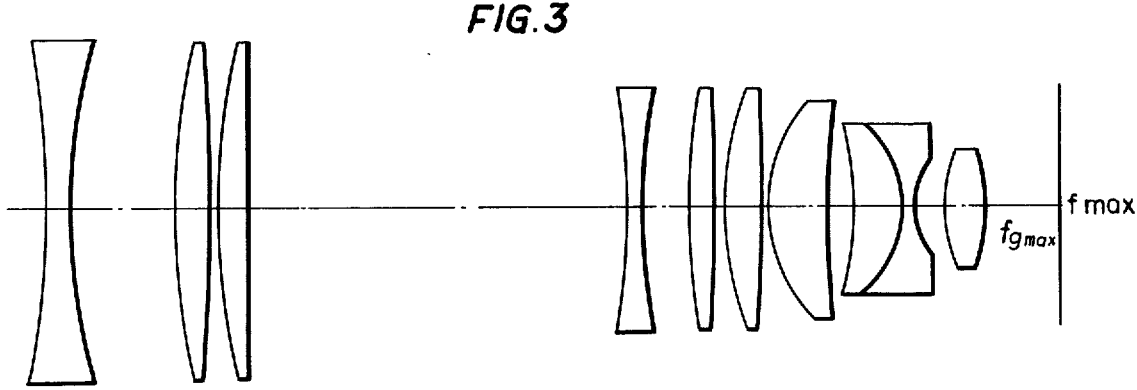
FIG. 3 shows the components in their position of maximum overall focal length.

The varifocal objective shown in FIGS. 1 – 3 comprises ten lenses $L_1$ - $L_{10}$. Lenses $L_1$ - $L_7$ and $L_{10}$ are singlets whereas lenses $L_8$ and $L_9$ are cemented to each other to form a cemented lens member comprising a so-called "abnormal glass pair", i.e., a doublet wherein the more strongly refractive (here negative) lens has the higher Abbe number in contrast to the normal practice.

As is apparent from FIG. 2, the lenses $L_1$ - $L_{10}$ form three distinct components I, II and III. The first component I consists of axially fixed lenses $L_1$ - $L_3$, with lenses $L_1$ and $L_2$ separated by an air space $d_2$ slightly greater than half the axial length $d_1+d_2+d_3+d_4+d_5$ of this component as will be apparent from the numerical values given below. The intermediate component II consists of the negative lens $L_4$ which is slidable along the optical axis; the rear component III comprises a positive base lens assembly which is rigidly coupled to the positive front component I.

Figure 4:
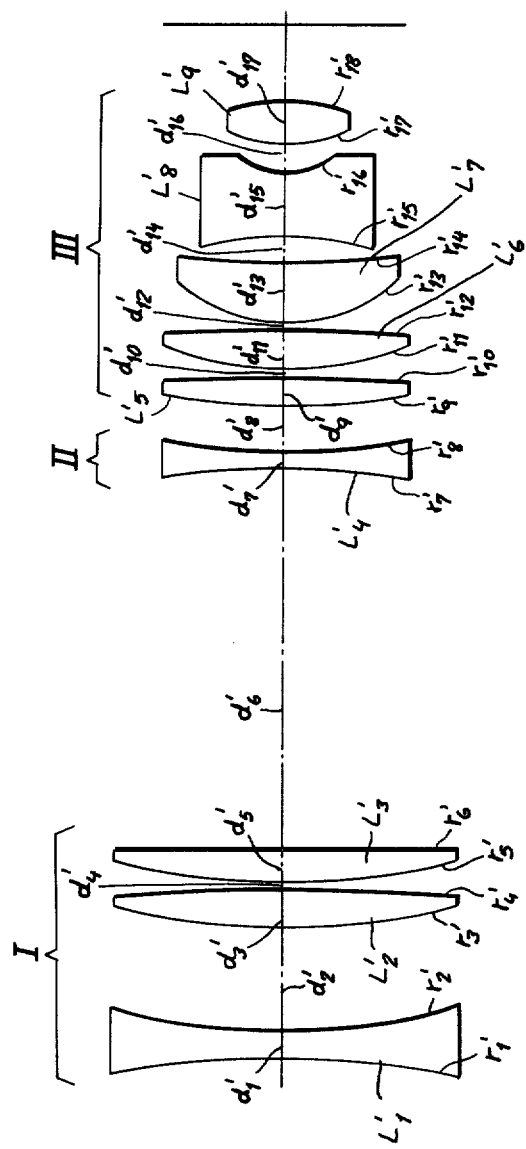
FIG. 4 shows a modified varifocal objective in the maximum-focal-length position.

FIGS. 1, 2 and 3 show the same ten-lens system in three different positions, i.e. with minimum overall focal length $f_{min}$, intermediate overall focal length $f_{med}$ and maximum overall focal length $f_{max}$. In FIG. 4 I have illustrated a modified system with only nine lenses $L'_1$ - $L'_9$, the doublet $L_8$, $L_9$ being replaced by a singlet $L'_8$.

In the following Tables I and II I have given representative numerical values for the radii $r_1$ - $r_{19}$ and the thicknesses and separations $d_1$ - $d_{18}$ of the lenses $L_1$ - $L_{10}$ of FIGS. 1 – 3, based upon a numerical value $f_{min} = 1$, together with the refractive indices $n_d$ and the Abbe numbers $\nu_d$ thereof, for two different examples; Table III represents corresponding values for the radii $r'_1$ - $r'_{18}$ and the thicknesses and separations $d'_1$ - $d_{17}$, as well as the refractive indices $n_d$ and the Abbe numbers $\nu_d$, for the lenses $L'_1$ - $L'_9$ of FIG. 4.

TABLE I

| Lenses | Radii | | Thicknesses and Separations | | $n_d$ | $\nu_d$ |
|---|---|---|---|---|---|---|
| $L_1$ | $r_1$ | = − 7.825 | $d_1$ = | 0.156 | 1.668 | 41.9 |
|  | $r_2$ | = + 3.940 | $d_2$ = | 0.656 | | |
| $L_2$ | $r_3$ | = + 4.673 | $d_3$ = | 0.257 | 1.620 | 60.3 |
|  | $r_4$ | = −10.336 | $d_4$ = | 0.008 | | |
| $L_3$ | $r_5$ | = + 5.451 | $d_5$ = | 0.211 | 1.620 | 60.3 |
|  | $r_6$ | = −37.513 | $d_6$ = | $\begin{cases} 0.125..f_{min} \\ 2.519..f_{max} \end{cases}$ | | |
|  | $r_7$ | = − 5.802 | | | | |

TABLE I-continued

| Lenses | Radii | | Thicknesses and Separations | | $n_d$ | $\nu_d$ |
|---|---|---|---|---|---|---|
| $L_4$ | | | $d_7 =$ | 0.109 | 1.678 | 55.2 |
| | $r_8 =$ | $+ 4.397$ | $d_8 =$ | $\begin{cases} 2.676..f_{min} \\ 0.282..f_{max} \end{cases}$ | | |
| $L_5$ | $r_9 =$ | $+ 6.239$ | $d_9 =$ | 0.187 | 1.589 | 61.3 |
| | $r_{10} =$ | $-18.918$ | $d_{10} =$ | 0.008 | | |
| $L_6$ | $r_{11} =$ | $+ 2.024$ | $d_{11} =$ | 0.273 | 1.641 | 60.1 |
| | $r_{12} =$ | $-25.749$ | $d_{12} =$ | 0.008 | | |
| $L_7$ | $r_{13} =$ | $+ 1.000$ | $d_{13} =$ | 0.398 | 1.641 | 60.1 |
| | $r_{14} =$ | $+10.406$ | $d_{14} =$ | 0.113 | | |
| $L_8$ | $r_{15} =$ | $- 4.847$ | $d_{15} =$ | 0.339 | 1.720 | 50.4 |
| | $r_{16} =$ | $- 0.660$ | $d_{16} =$ | 0.078 | 1.699 | 30.1 |
| | $r_{17} =$ | $+ 0.523$ | $d_{17} =$ | 0.183 | | |
| | $r_{18} =$ | $+ 1.292$ | $d_{18} =$ | 0.296 | 1.717 | 48.0 |
| $L_{10}$ | $r_{19} =$ | $- 1.753$ | | | | |

$f_{min} = 1.000$
$f_{max} = 1.900$
Relative Aperture 1:1.2
$2y' = 0.523$

TABLE II

| Lenses | Radii | | Thicknesses and Separations | | $n_d$ | $\nu_d$ |
|---|---|---|---|---|---|---|
| $L_1$ | $r_1 =$ | $- 6.240$ | $d_1 =$ | 0.156 | 1.618 | 49.8 |
| | $r_2 =$ | $+ 3.990$ | $d_2 =$ | 0.656 | | |
| $L_2$ | $r_3 =$ | $+ 4.680$ | $d_3 =$ | 0.234 | 1.620 | 60.3 |
| | $r_4 =$ | $- 10.238$ | $d_4 =$ | 0.008 | | |
| $L_3$ | $r_5 =$ | $+ 4.963$ | $d_5 =$ | 0.234 | 1.620 | 60.3 |
| | $r_6 =$ | $-121.306$ | $d_6 =$ | $\begin{cases} 0.102..f_{min} \\ 2.364..f_{max} \end{cases}$ | | |
| $L_4$ | $r_7 =$ | $- 5.821$ | $d_7 =$ | 0.109 | 1.623 | 56.9 |
| | $r_8 =$ | $+ 3.784$ | $d_8 =$ | $\begin{cases} 2.700..f_{min} \\ 0.438..f_{max} \end{cases}$ | | |
| $L_5$ | $r_9 =$ | $+ 7.825$ | $d_9 =$ | 0.187 | 1.589 | 61.3 |
| | $r_{10} =$ | $- 11.700$ | $d_{10} =$ | 0.008 | | |
| $L_6$ | $r_{11} =$ | $+ 2.152$ | $d_{11} =$ | 0.273 | 1.641 | 60.1 |
| | $r_{12} =$ | $- 12.932$ | $d_{12} =$ | 0.008 | | |
| $L_7$ | $r_{13} =$ | $+ 0.952$ | $d_{13} =$ | 0.393 | 1.589 | 61.3 |
| | $r_{14} =$ | $+ 13.916$ | $d_{14} =$ | 0.117 | | |
| $L_8$ | $r_{15} =$ | $- 6.006$ | $d_{15} =$ | 0.351 | 1.720 | 50.4 |
| | $r_{16} =$ | $- 0.429$ | $d_{16} =$ | 0.078 | 1.699 | 30.1 |
| $L_9$ | $r_{17} =$ | $+ 0.503$ | $d_{17} =$ | 0.246 | | |
| | $r_{18} =$ | $+ 1.104$ | $d_{18} =$ | 0.312 | 1.720 | 50.4 |
| $L_{10}$ | $r_{19} =$ | $- 1.931$ | | | | |

$f_{min} = 1.000$
$f_{max} = 1.825$
Relative Aperture 1:1.2
$2y' = 0.523$

TABLE III

| Lenses | Radii | | Thicknesses and Separations | | $n_d$ | $\nu_d$ |
|---|---|---|---|---|---|---|
| $L_1'$ | $r_1' =$ | $- 6.400$ | $d_1' =$ | 0.160 | .618 | 49.8 |
| | $r_2' =$ | $+ 4.092$ | $d_2' =$ | 0.673 | | |
| $L_2'$ | $r_3' =$ | $+ 5.600$ | $d_3' =$ | 0.240 | .620 | 60.3 |
| | $r_4' =$ | $- 10.000$ | $d_4' =$ | 0.008 | | |
| $L_3'$ | $r_5' =$ | $+ 4.516$ | $d_5' =$ | 0.240 | .620 | 60.3 |
| | $r_6' =$ | $-124.416$ | $d_6' =$ | $\begin{cases} 0.104..f_{min} \\ 2.424..f_{max} \end{cases}$ | | |
| $L_4'$ | $r_7' =$ | $- 6.770$ | $d_7' =$ | 0.112 | .623 | 56.9 |
| | $r_8' =$ | $+ 3.604$ | $d_8' =$ | $\begin{cases} 2.769..f_{min} \\ 0.449..f_{max} \end{cases}$ | | |
| $L_5'$ | $r_9' =$ | $+ 8.026$ | $d_9' =$ | 0.192 | .589 | 61.3 |
| | $r_{10}' =$ | $- 54.640$ | $d_{10}' =$ | 0.016 | | |
| $L_6'$ | $r_{11}' =$ | $+ 2.224$ | $d_{11}' =$ | 0.232 | .589 | 61.3 |
| | $r_{12}' =$ | $- 8.997$ | $d_{12}' =$ | 0.052 | | |
| $L_7'$ | $r_{13}' =$ | $+ 0.912$ | $d_{13}' =$ | 0.384 | .589 | 61.3 |
| | $r_{14}' =$ | $+ 10.194$ | $d_{14}' =$ | 0.144 | | |
| $L_8'$ | $r_{15}' =$ | $- 6.215$ | $d_{15}' =$ | 0.420 | .805 | 25.4 |
| | $r_{16}' =$ | $+ 0.536$ | $d_{16}' =$ | 0.240 | | |
| $L_9'$ | $r_{17}' =$ | $+ 0.825$ | $d_{17}' =$ | 0.304 | .691 | 54.7 |
| | $r_{18}' =$ | $- 2.001$ | | | | |

$f_{min} = 1.000$
$f_{max} = 1.865$
Relative Aperture 1:1.2
$2y' = 0.523$

The individual focal lengths $f_I$, $f_{II}$ and $f_{III}$ of components I, II and III can be calculated from the foregoing values as follows:

| | $f_I$ | $f_{II}$ | $f_{III}$ |
|---|---|---|---|
| TABLE I | +7.89 | −3.67 | +1.46 |
| TABLE II | +7.81 | −3.66 | +1.50 |
| TABLE III | +7.96 | −3.76 | +1.56 | which corresponds, approximately, to a ratio of +5.5 : −2.5 : +1.

In all of the dimensions given in the above three examples the following tolerances are to be assumed to apply a deviation of the curvature of individual surfaces by up to ± 10 percent of the refractive power of the corresponding lens element; a deviation of the thicknesses of up to ± 10 percent of the focal length of the corresponding lens element, a deviation of the refractive numbers of up to ± 0.03 and of the Abbe numbers of up to ± 5.

I claim:
1. A varifocal objective consisting of a fixed positive front component, an axially shiftable negative intermediate component and a fixed positive rear component;

said front component consisting of a biconcave first lens, a biconvex second lens, and a nearly planoconvex third lens closely spaced from said second lens, said first lens being separated from said second lens by an air space close to half the axial length of said front component; said intermediate component being a single negative lens; said rear component consisting, from front to rear, of two biconvex positive lens members, a meniscus-shaped positive lens member, a biconcave lens member and another biconvex lens member; the individual focal lengths of said front component, said intermediate component and said rear component being approximately related in the ratio +5.5 : −2.5 : +1, the relative positioning of said components being such as to provide an image diagonal which is shorter than the separation of said first and second lenses.

2. A varifocal objective as defined in claim 1 wherein said positive lens members are singlets.

3. A varifocal objective as defined in claim 1 wherein the numerical values of the radii $r_1$ - $r_{19}$ and of the thicknesses and separations $d_1$ - $d_{18}$ of said first, second and third lenses $L_1$, $L_2$, $L_3$, said single negative lens $L_4$, said two biconvex lens members $L_5$, $L_6$, said meniscus-shaped lens member $L_7$, two cemented lenses $L_8$, $L_9$ constituting said biconcave lens member, and said other biconvex lens member $L_{10}$, based upon a value of unity for the minimum overall focal length, their refractive indices $n_d$ and their Abbe numbers $\nu_d$ are substantially as given in the following table:

| Lenses | Radii | Thicknesses and Separations | $n_d$ | $\nu_d$ |
|---|---|---|---|---|
| $L_1$ | $r_1 = -7.825$ | $d_1 = 0.156$ | .668 | 41.9 |
|  | $r_2 = +3.940$ | $d_2 = 0.656$ |  |  |
| $L_2$ | $r_3 = +4.673$ | $d_3 = 0.257$ | .620 | 60.3 |
|  | $r_4 = -10.336$ | $d_4 = 0.008$ |  |  |
| $L_3$ | $r_5 = +5.451$ | $d_5 = 0.211$ | .620 | 60.3 |
|  | $r_6 = -37.513$ | $d_6 = \{0.125..f_{min}, 2.519..f_{max}\}$ |  |  |
| $L_4$ | $r_7 = -5.802$ | $d_7 = 0.109$ | .678 | 55.2 |
|  | $r_8 = +4.397$ | $d_8 = \{2.676..f_{min}, 0.282..f_{max}\}$ |  |  |
| $L_5$ | $r_9 = +6.239$ | $d_9 = 0.187$ | .589 | 61.3 |
|  | $r_{10} = -18.918$ | $d_{10} = 0.008$ |  |  |
| $L_6$ | $r_{11} = +2.024$ | $d_{11} = 0.273$ | .641 | 60.1 |
|  | $r_{12} = -25.749$ | $d_{12} = 0.008$ |  |  |
| $L_7$ | $r_{13} = +1.000$ | $d_{13} = 0.398$ | .641 | 60.1 |
|  | $r_{14} = +10.406$ | $d_{14} = 0.113$ |  |  |
| $L_8$ | $r_{15} = -4.847$ | $d_{15} = 0.339$ | .720 | 50.4 |
|  | $r_{16} = -0.660$ | $d_{16} = 0.078$ | .699 | 30.1 |
|  | $r_{17} = +0.523$ | $d_{17} = 0.183$ |  |  |
| $L_{10}$ | $r_{18} = +1.292$ | $d_{18} = 0.296$ | .717 | 48.0 |
|  | $r_{19} = -1.753$ |  |  |  |

4. A varifocal objective as defined in claim 1 wherein the numerical values of the radii $r_1$ - $r_{19}$ and of the thicknesses and separations $d_1$ - $d_{18}$ of said first, second and third lenses $L_1$, $L_2$, $L_3$, said single negative lens $L_4$, said two biconvex lens members $L_5$, $L_6$, said meniscus-shaped lens member $L_7$, two cemented lenses $L_8$, $L_9$ constituting said biconcave lens member, and said other biconvex lens member $L_{10}$, based upon a value of unity for the minimum overall focal length, their refractive indices $n_d$ and their Abbe numbers $\nu_d$ are substantially as given in the following table:

| Lenses | Radii | Thicknesses and Separations | $n_d$ | $\nu_d$ |
|---|---|---|---|---|
| $L_1$ | $r_1 = -6.240$ | $d_1 = 0.156$ | .618 | 49.8 |
|  | $r_2 = +3.990$ | $d_2 = 0.656$ |  |  |
| $L_2$ | $r_3 = +4.680$ | $d_3 = 0.234$ | .620 | 60.3 |
|  | $r_4 = -10.238$ | $d_4 = 0.008$ |  |  |
| $L_3$ | $r_5 = +4.963$ | $d_5 = 0.234$ | .620 | 60.3 |
|  | $r_6 = -121.306$ | $d_6 = \{0.102..f_{min}, 2.364..f_{max}\}$ |  |  |
| $L_4$ | $r_7 = -5.821$ | $d_7 = 0.109$ | .623 | 56.9 |
|  | $r_8 = +3.784$ | $d_8 = \{2.700..f_{min}, 0.438..f_{max}\}$ |  |  |
| $L_5$ | $r_9 = +7.825$ | $d_9 = 0.187$ | .589 | 61.3 |
|  | $r_{10} = -11.700$ | $d_{10} = 0.008$ |  |  |
| $L_6$ | $r_{11} = +2.152$ | $d_{11} = 0.273$ | .641 | 60.1 |
|  | $r_{12} = -12.932$ | $d_{12} = 0.008$ |  |  |
| $L_7$ | $r_{13} = +0.952$ | $d_{13} = 0.393$ | .589 | 61.3 |
|  | $r_{14} = +13.916$ | $d_{14} = 0.117$ |  |  |
| $L_8$ | $r_{15} = -6.006$ | $d_{15} = 0.351$ | .720 | 50.4 |
| $L_9$ | $r_{16} = -0.429$ | $d_{16} = 0.078$ | .699 | 30.1 |
|  | $r_{17} = +0.503$ | $d_{17} = 0.246$ |  |  |
| $L_{10}$ | $r_{18} = +1.104$ | $d_{18} = 0.312$ | .720 | 50.4 |
|  | $r_{19} = -1.931$ |  |  |  |

5. A varifocal objective as defined in claim 1, wherein the numerical values of the radii $r'_1$ - $r'_{18}$ and of the thicknesses and separations $d'_1$ - $d'_{17}$ of said first, second and third lenses $L'_1$, $L'_2$, $L'_3$, said single negative lens $L'_4$, said two biconvex lens members $L'_5$, $L'_6$, said meniscus-shaped lens member $L'_7$, said biconcave lens member $L'_8$ and said other biconvex lens member $L'_9$, based upon a value of unity for the minimum overall focal length, their refractive indices $n_d$ and their Abbe numbers $\nu_d$ are substantially as given in the following table:

| Lenses | Radii | Thicknesses and Separations | $n_d$ | $\nu_d$ |
|---|---|---|---|---|
| $L_1'$ | $r_1' = -6.400$ | $d_1' = 0.160$ | .618 | 49.8 |
|  | $r_2' = +4.092$ |  |  |  |
| $L_2'$ | $r_3' = +5.600$ | $d_2' = 0.673$ |  |  |
|  |  | $d_3' = 0.240$ | .620 | 60.3 |
|  | $r_4' = -10.000$ | $d_4' = 0.008$ |  |  |
| $L_3'$ | $r_5' = +4.516$ | $d_5' = 0.240$ | .620 | 60.3 |
|  | $r_6' = -124.416$ |  |  |  |
|  |  | $d_6' = \begin{cases} 0.104..f_{min} \\ 2.424..f_{max} \end{cases}$ |  |  |
| $L_4'$ | $r_7' = -6.770$ | $d_7' = 0.112$ | .623 | 56.9 |
|  | $r_8' = +3.604$ |  |  |  |
|  |  | $d_8' = \begin{cases} 2.769..f_{min} \\ 0.449..f_{max} \end{cases}$ |  |  |

-continued

| Lenses | Radii | Thicknesses and Separations | $n_d$ | $\nu_d$ |
|---|---|---|---|---|
| $L_5'$ | $r_9' = +8.026$ | $d_9' = 0.192$ | .589 | 61.3 |
|  | $r_{10}' = -54.640$ | $d_{10}' = 0.016$ |  |  |
| $L_6'$ | $r_{11}' = +2.224$ | $d_{11}' = 0.232$ | .589 | 61.3 |
|  | $r_{12}' = -8.997$ | $d_{12}' = 0.052$ |  |  |
| $L_7'$ | $r_{13}' = +0.912$ | $d_{13}' = 0.384$ | .589 | 61.3 |
|  | $r_{14}' = +10.194$ | $d_{14}' = 0.144$ |  |  |
| $L_8'$ | $r_{15}' = -6.215$ | $d_{15}' = 0.420$ | .805 | 25.4 |
|  | $r_{16}' = +0.536$ | $d_{16}' = 0.240$ |  |  |
| $L_9'$ | $r_{17}' = +0.825$ | $d_{17}' = 0.304$ | .691 | 54.7 |
|  | $r_{18}' = -2.001$ |  |  |  |

* * * * *